US010808353B2

(12) United States Patent
Green et al.

(10) Patent No.: US 10,808,353 B2
(45) Date of Patent: Oct. 20, 2020

(54) DEFECT DETECTION SYSTEMS AND METHODS

(71) Applicant: Northrop Grumman Innovation Systems, Inc., Plymouth, MN (US)

(72) Inventors: Nathan T. Green, Holladay, UT (US); James Scott, Beavercreek, OH (US); Cameron D. Gould, South Ogden, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 298 days.

(21) Appl. No.: 15/694,424

(22) Filed: Sep. 1, 2017

(65) Prior Publication Data

US 2019/0072500 A1    Mar. 7, 2019

(51) Int. Cl.
*G01N 22/02* (2006.01)
*D06H 3/14* (2006.01)

(52) U.S. Cl.
CPC ............. *D06H 3/14* (2013.01); *G01N 22/02* (2013.01)

(58) Field of Classification Search
CPC ...... G01N 22/00; G01N 22/02; G01N 22/005; G01N 22/04; G01N 23/00; G01N 23/005; G01N 23/02; G01N 23/20; G01N 23/22; G01N 27/00; G01N 27/002; G01N 27/007; G01N 27/02; G01N 27/26; G01N 27/60; G01N 27/62; G01N 27/72; G01N 27/92; G01S 13/885; G01S 13/887; G01S 13/888; D06H 3/14; D06H 3/00; D06H 3/12; D06H 3/125; B26D 5/00

USPC ................................ 324/639; 226/45; 26/70
See application file for complete search history.

(56) References Cited

U.S. PATENT DOCUMENTS

| | | |
|---|---|---|
| 5,420,589 A | 5/1995 | Wells et al. |
| 6,377,201 B1 | 4/2002 | Chu |
| 6,501,414 B2 | 12/2002 | Arndt et al. |
| 6,772,091 B1 | 8/2004 | Roberts |
| 6,864,826 B1 | 3/2005 | Stove |
| 7,679,375 B2 * | 3/2010 | Merkel ................. G01N 22/00 324/639 |
| 7,982,661 B2 * | 7/2011 | Beasley ................. G01S 7/354 342/118 |
| 8,456,349 B1 * | 6/2013 | Piesinger ............... G01S 13/46 342/133 |
| 2005/0191918 A1 * | 9/2005 | Langley ................. B32B 27/08 442/59 |
| 2006/0214835 A1 * | 9/2006 | Lee ........................ G01N 22/00 342/22 |

(Continued)

OTHER PUBLICATIONS

Dentro LRX Brochure "Rugged On-Line Scanner" MVG Microwave Vision Group 2014; 8 pages.

*Primary Examiner* — Erin F Heard
*Assistant Examiner* — Michael W Justice
(74) *Attorney, Agent, or Firm* — TraskBritt

(57) ABSTRACT

A defect detection system comprises a movement assembly and a sensor assembly. The movement assembly is configured and positioned to hold and move a substantially non-conductive structure. The sensor assembly comprises at least one radar device configured and positioned to detect conductive debris in the substantially non-conductive structure as portions of the substantially non-conductive structure move therepast. A defect detection method and a processing a composite structure are also described.

20 Claims, 4 Drawing Sheets

(56) References Cited

U.S. PATENT DOCUMENTS

| | | | | |
|---|---|---|---|---|
| 2008/0169961 A1* | 7/2008 | Steinway | ............... | A61B 5/05 342/27 |
| 2010/0178716 A1* | 7/2010 | Zapalac | ............. | H01L 31/0392 438/4 |
| 2014/0091013 A1* | 4/2014 | Streufert | ............... | B65G 47/46 209/552 |
| 2014/0269815 A1* | 9/2014 | Sloat | ..................... | G01N 22/02 374/5 |

* cited by examiner

DEFECT DETECTION SYSTEMS AND METHODS

TECHNICAL FIELD

The disclosure, in various embodiments, relates generally to systems, apparatuses, and methods for detecting defects in non-conductive structures. More specifically, embodiments of the disclosure relate to apparatuses, systems, and methods for detecting defects in non-conductive composite structures.

BACKGROUND

Composite structures are employed in a number of industrial and military applications including, for example, aerospace, marine, and automotive applications. Composite structures can include reinforcing fibers embedded in a matrix. Depending on the material composition thereof, composite structures can exhibit a variety of properties favorable to a desired application, such as high temperature stability, high thermal resistance, high mechanical integrity, high hardness, high corrosion resistance, light weight, non-magnetic properties, and non-conductive properties.

Unfortunately, processes of forming and/or handling a composite structure can introduce undesirable defects in the composite structure that can negatively affect the performance, reliability, durability, and/or processing efficiency of the composite structure. For example, processes of forming and/or handling a non-conductive (e.g., dielectric) composite structure can result in conductive debris embedded within a non-conductive composite structure that can negatively affect the desired characteristics (e.g., the ability to absorb electromagnetic energy) of the non-conductive composite structure and/or of devices (e.g., aerospace devices, marine devices, automotive devices, etc.) including the non-conductive composite structure. Conventional methods of detecting and removing undesirable debris (e.g., conductive debris) from composite structures (e.g., non-conductive composite structures), such as visual inspection and manual removal, can be prohibitively expensive as such methods can be time and labor intensive, and can still result in undesirable product defects due to conventional debris detection capabilities (e.g., lower boundaries of detectable debris sizes) and/or human error.

It would, therefore, be desirable to have new systems, apparatuses, and methods for processing non-conductive structures, such as non-conductive composite structures, that are easy to employ, cost-effective, and more versatile as compared to conventional systems, apparatuses, and methods for processing non-conductive structures.

BRIEF SUMMARY

Embodiments described herein include systems, apparatuses, and methods for detecting defects in non-conductive structures. In accordance with one embodiment described herein, a defect detection system comprises a movement assembly and a sensor assembly. The movement assembly is configured and positioned to hold and move a substantially non-conductive structure. The sensor assembly comprises at least one radar device configured and positioned to detect conductive debris in the substantially non-conductive structure as portions of the substantially non-conductive structure move therepast.

In additional embodiments, a defect detection method comprises delivering a substantially non-conductive structure to a defect detection system comprising a movement assembly and a sensor assembly. The substantially non-conductive structure is moved through the defect detection system using the movement assembly. Electromagnetic energy is directed into the substantially non-conductive structure from at least one radar device of the sensor assembly to detect conductive debris within the substantially non-conductive structure.

In further embodiments, a method of processing a composite structure comprises pulling a prepreg structure comprising a non-conductive preform infiltrated with a non-conductive slurry from a first reel device. Electromagnetic energy is directed into the prepreg structure from a plurality of monostatic radar devices positioned laterally adjacent the prepreg structure to detect conductive debris within the prepreg structure. Portions of the prepreg structure containing the detected conductive debris are marked. The marked portions of the prepreg structure and the detected conductive debris are removed while substantially maintaining a remainder of the prepreg structure.

DETAILED DESCRIPTION

Figure 1:
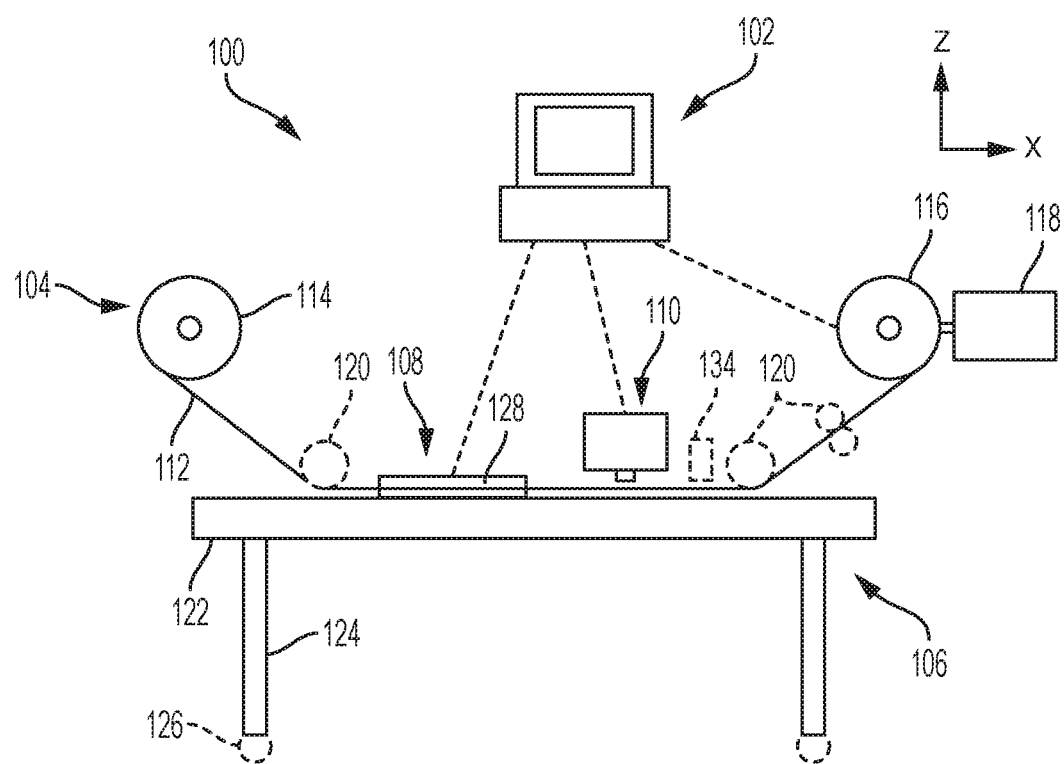
FIG. 1 is a simplified schematic side elevation view of a defect detection system, in accordance with embodiments of the disclosure.

Systems, apparatuses, and methods for detecting defects in non-conductive structures are described. In some embodiments, a defect detection system comprises a movement assembly and a sensor assembly. The movement assembly may be configured and operated to receive, hold, and move (e.g., continuously move) at least one non-conductive structure (e.g., at least one non-conductive composite structure) to be inspected for defects (e.g., embedded conductive debris). The sensor assembly is operatively associated with the movement assembly, and includes one or more radar devices configured, positioned, and operated to direct electromagnetic energy into the non-conductive structure and to receive electromagnetic energy (e.g., reflected electromagnetic energy) from the non-conductive structure to identify the location of defects (e.g., embedded conductive debris) in the non-conductive structure. The defect detection system may also include one or more (e.g., each) of a main computer/electronics assembly, a support assembly, and a marking assembly. The main computer/electronics assembly may be configured and operated to communicate with and control one or more other components (e.g., the movement assembly, the sensor assembly, the marking assembly, the material removal device, etc.) of the defect detection system. The support assembly may be configured, positioned, and operated to support (e.g., carry) one or more other components of the defect detection system, and to mitigate the effects of background electromagnetic energy during the defect detection process. The marking assembly may be configured, positioned, and operated to mark (e.g., physically mark, digitally mark) the non-conductive structure at the location of detected defects along the non-conductive structure for subsequent action (e.g., material removal processes). The defect detection system may further include a material removal device to remove the marked locations of the non-conductive structure, along with the defects (e.g., embedded conductive debris) associated therewith. The systems, apparatuses, and methods of the disclosure may be used to efficiently inspect a non-conductive structure (e.g., a non-conductive composite structure) for defects (e.g., conductive debris), reducing costs and risks associated with processing the non-conductive structure and/or enhancing product quality (e.g., reducing undesirable contamination) and reliability as compared to conventional systems and conventional methods of processing a non-conductive structure.

In the following detailed description, reference is made to the accompanying drawings that form a part hereof and, in which is shown by way of illustration, specific embodiments in which the disclosure may be practiced. These embodiments are described in sufficient detail to enable those of ordinary skill in the art to practice that described in this disclosure, and it is to be understood that other embodiments may be utilized, and that structural, logical, and electrical changes may be made within the scope of the disclosure.

In addition, it is noted that the embodiments and portions thereof may be described in terms of a process that is depicted as a flowchart, a flow diagram, a structure diagram, or a block diagram. A process may correspond to a method, a function, an operation, a procedure, a subroutine, a subprogram, etc. Furthermore, the methods disclosed herein may be implemented in hardware, software, or a combination thereof. When executed as firmware or software, the instructions for performing the methods and processes described herein may be stored on a computer-readable medium. A computer-readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory. Furthermore, some methods disclosed herein may include human operators initiating commands or otherwise perform operations that may affect components of the system, including selecting instructions when prompted by the software.

Referring in general to the following description and accompanying drawings, various embodiments of the disclosure are illustrated to show its structure and method of operation. Common elements of the illustrated embodiments are designated with like reference numerals. It should be understood that the figures presented are not meant to be illustrative of actual views of any particular portion of the actual structure, system, or method, but are merely idealized representations employed to more clearly and fully depict the disclosure defined by the claims below.

As used herein, the terms "comprising," "including," "containing," "characterized by," and grammatical equivalents thereof are inclusive or open-ended terms that do not exclude additional, unrecited elements or method steps, but also include the more restrictive terms "consisting of and" consisting essentially of and grammatical equivalents thereof. As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should, or must be, excluded.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, the term "about" in reference to a given parameter is inclusive of the stated value and has the meaning dictated by the context (e.g., it includes the degree of error associated with measurement of the given parameter).

FIG. 1 is a simplified schematic side elevation view of a defect detection system 100, in accordance with embodiments of the disclosure. The defect detection system 100 may be configured and operated to detect and communicate defects (e.g., conductive debris) in non-conductive structures (e.g., non-conductive composite structures). As shown in FIG. 1, the defect detection system 100 may include a main computer/electronics assembly 102, a movement assembly 104, a support assembly 106, a sensor assembly 108, and a marking assembly 110. With the description as provided below, it will be readily apparent to one of ordinary skill in the art that the defect detection system 100 described herein may be used in various applications. In other words, the defect detection system 100 may be used whenever it is desired identify defects (e.g., embedded debris) in one or more materials.

The main computer/electronics assembly 102 may serve as a common interface facilitating the simple and efficient control and analysis of various components (e.g., the movement assembly 104, the sensor assembly 108, the marking assembly 110, etc.) of the defect detection system 100. The main computer/electronics assembly 102 may include devices (e.g., multichannel analyzers, analog-to-digital converters, pulse counters, amplifiers, etc.) for receiving and analyzing data from the different components of the defect detection system 100. In addition, the main computer/electronics assembly 102 may include input devices (e.g., mouse, keyboard, etc.) through which an operator may input information, operate the main computer/electronics assembly 102, and/or electronically operate other operations of the various components of the defect detection system 100. Furthermore, the main computer/electronics assembly 102 may include output devices or other peripheral devices (e.g., monitors, printers, speakers, laser projectors, etc.) from which an operator may interpret results of measurements, characterization of the measurements, the operational status of the various components of defect detection system 100, or other similar information. The main computer/electronics assembly 102 may also include storage media such as hard drives, external hard drives, Flash memory, RAM, ROM, DVDs, and other computer-readable media for storing information related to measurements or status of the various components of the defect detection system 100.

Computer-readable media, such as storage media, may also be used for executing instructions and operations related to performing, analyzing, characterizing measurements, and/or for controlling various components of the defect detection system 100. In other words, the main computer/electronics assembly 102 includes control logic, which may include instructions that permit the defect detection system 100 to operate. The main computer/electronics assembly 102 may utilize control logic to automatically monitor and automatically control (e.g., activate, deactivate, move, position, etc.) various components (e.g., reels, gear motors, antenna devices, marking devices, etc.) of the defect detection system 100. The control logic may continuously monitor the operability of the various components as well as the movement of one or more composite structures associated therewith, and may automatically change operating parameters of the various components to account for defects detected in the one or more composite structures. The control logic may also include a user interface, which may provide operators with prompts and directions for simplified operation. For example, the user interface may be a menu-driven graphical user interface (GUI) for ease of use and control by an operator. The user interface may perform operations automatically, through a virtual push-button interface on the computer screen, or through a combination thereof. The user interface may include pop-up windows that present options regarding system configuration or operating parameters the operator can choose from to customize composite structure processing. The user interface may also include pop-up windows that communicate advisory information and directions to the operator. The control logic may further include instructions for other operations such as automated calibration, data acquisition, analysis, and data storage.

With continued reference to FIG. 1, the movement assembly 104 may be configured and operated to hold and convey (e.g., move, transfer) at least one substantially non-conductive structure 112 (e.g., at least one non-conductive composite structure) to be evaluated (e.g., examined, analyzed) by the defect detection system 100. The movement assembly 104 may be in electronic communication (e.g., wired communication, wireless communication) with the main computer/electronics assembly 102. The movement assembly 104 may be configured to receive an output (e.g., signal) from the main computer/electronics assembly 102 and to adjust a movement rate of the substantially non-conductive structure 112 past the sensor assembly 108 and the marking assembly 110 at least partially based on the output. As shown in FIG. 1, the movement assembly 104 may include at least one first reel device 114 (e.g., at least one first spool structure) configured and operated to temporarily hold the substantially non-conductive structure 112, at least one second reel device 116 (e.g., at least one second spool structure) downstream of the first reel device 114 and configured and operated to receive and hold the substantially non-conductive structure 112 transferred from the first reel device 114, at least one movement control device 118 configured and positioned to at least partially control the transfer of the substantially non-conductive structure 112 from the first reel device 114 to the second reel device 116, and, optionally, one or more rotatable devices 120 configured and positioned to assist with desired positioning and movement of the substantially non-conductive structure 112 as it is transferred from the first reel device 114 to the second reel device 116. For example, rotatable device 120 may comprise a tensioner to maintain tension and remove any slack in the substantially non-conductive structure 112 as it moves from first reel device 114 to second reel device 116.

The substantially non-conductive structure 112 may be formed of and include one or more non-conductive materials. For example, the substantially non-conductive structure 112 may comprise a non-conductive prepreg structure including a non-conductive fiber preform infiltrated (e.g., impregnated) with a non-conductive slurry. As used herein, the term "fiber preform" means and includes a structure formed of and including fibers. The fibers may be continuous, and may be oriented in a direction generally parallel to, generally perpendicular to, or at another angle with respect to a length of the fiber preform. The non-conductive fiber preform may comprise a single tow of the fibers (e.g., a substantially unidirectional bundle of the fibers), may comprise a tape of multiple tows of the fibers (e.g., an array of substantially unidirectional tows of the fibers stitched together using another material, such as a glass material), or may comprise a woven fabric of multiple tows of the fibers (e.g., a plain weave of the multiple tows, a 4 harness satin weave of the multiple tows, a 5 harness satin weave of the multiple tows, an 8 harness satin weave of the multiple tows, etc.). The non-conductive fiber preform may have any dimensions (e.g., length, width, thickness) compatible with the components (e.g., the movement assembly 104, the sensor assembly 108, the marking assembly 110, etc.) of the defect detection system 100. For example, the non-conductive fiber preform may have any desired length, and may have a width compatible with the dimensions of the other components of the defect detection system 100, such as a width within a range of from about one-eighth (⅛) inch to about one (1) meter.

If the substantially non-conductive structure 112 comprises a non-conductive prepreg structure, the fibers of the non-conductive fiber preform may be formed of and include a non-conductive material (e.g., a non-conductive ceramic material, a non-conductive polymeric material) compatible with the other components (e.g., the non-conductive slurry) of the substantially non-conductive structure 112. As used herein, the term "compatible" means and includes that a material that does not react with, break down, or absorb another material in an unintended way, and that also does not impair the chemical and/or mechanical properties of the another material in an unintended way. The fibers may be non-conductive oxide fibers (e.g., non-conductive oxide ceramic fibers, non-conductive oxide glass fibers, etc.), or may be non-conductive non-oxide fibers (e.g., non-conductive non-oxide ceramic fibers, non-conductive non-oxide glass fibers, etc.). In some embodiments, the fibers comprise glass fibers. In additional embodiments, the fibers comprise quartz fibers. The non-conductive fiber preform, including the fibers thereof, may be formed using conventional processes and equipment, which are not described in detail herein.

In addition, if substantially non-conductive structure 112 comprises a non-conductive prepreg structure, the non-conductive slurry may be a non-conductive material suitable for subsequently forming a desired matrix (e.g., a polymeric matrix, a ceramic matrix) over and around the non-conductive fiber preform. For example, the non-conductive slurry may comprise a non-conductive material formulated to facilitate the formation of a polymeric matrix (e.g., a plastic matrix) or a ceramic matrix upon further processing. In some embodiments, the non-conductive slurry comprises a non-conductive pre-polymeric matrix material (e.g., a non-conductive oxide-based pre-polymeric matrix slurry, a non-conductive non-oxide-based pre-polymeric matrix slurry). In additional embodiments, the non-conductive slurry comprises a non-conductive pre-ceramic matrix material (e.g., a non-conductive oxide-based pre-ceramic matrix slurry, a non-conductive non-oxide-based pre-ceramic matrix slurry). The non-conductive slurry may be formed using conventional processes and equipment, which are not described in detail herein.

If the substantially non-conductive structure 112 comprises a non-conductive prepreg structure, the non-conductive fiber preform and the non-conductive slurry thereof may be covered with one or more non-conductive backing structures (e.g., non-conductive sheet structure(s), non-conductive liner structure(s), non-conductive film structure(s)). The non-conductive backing structure(s) may permit different portions of the non-conductive prepreg structure to be wrapped (e.g., wound, spooled, coiled, etc.) around one another without adhering to one another, and may subsequently be removed while substantially maintaining the non-conductive fiber preform and the non-conductive slurry of the substantially non-conductive structure 112.

In additional embodiments, the substantially non-conductive structure 112 may comprise a structure other than a non-conductive prepreg structure. By way of non-limiting example, the substantially non-conductive structure 112 may comprise a non-conductive fiber preform that has not yet been impregnated with a slurry. The substantially non-conductive structure 112 may, for example, be impregnated with the slurry subsequent to examination using the defect detection system 100. In such embodiments, the resulting prepreg structure may optionally be subjected to examination to identify any defects (e.g., conductive-debris-based defects) therein using another defect detection system substantially similar to and downstream of the defect detection system 100.

The substantially non-conductive structure 112 may exhibit a substantially uniform (e.g., non-variable) composition of non-conductive material(s) across all dimensions (e.g., length, width, thickness) thereof, or may exhibit an at least partial variable (e.g., non-uniform) composition of non-conductive material(s) across one or more of the dimensions thereof. In some embodiments, the substantially non-conductive structure 112 exhibits a variable composition of non-conductive material(s) across the length thereof. For example, a first portion (e.g., a first region, a first section) of the substantially non-conductive structure 112 proximate a terminal end of the substantially non-conductive structure 112 may exhibit a different material composition, and optionally, a different structure, than at least one additional portion of the substantially non-conductive structure 112. The different material composition of the first portion of the substantially non-conductive structure 112 may, for example, permit the substantially non-conductive structure 112 to initially be run between terminal components (e.g., the first reel device 114 and the second reel device 116) of the movement assembly 104 without omitting examination of desirable non-conductive material(s) of the substantially non-conductive structure 112 for defects (e.g., embedded conductive debris). The length of the first portion of the substantially non-conductive structure 112 may at least partially depend on the configuration of the movement assembly 104 (e.g., a distance needed to run the substantially non-conductive structure 112 between the first reel device 114 and the second reel device 116, as influenced by any intervening components of the movement assembly 104). In some embodiments, the first portion of the substantially non-conductive structure 112 is within a range of from about one (1) meter to about one-hundred (100) meters in length.

Still referring to FIG. 1, the first reel device 114 and the second reel device 116 of the movement assembly 104 are operatively associated with the substantially non-conductive structure 112. A first end of the substantially non-conductive structure 112 may be affixed (e.g., attached, physically connected, coupled) to the first reel device 114, and a second, opposing end of the substantially non-conductive structure 112 may be affixed (e.g., attached, physically connected, coupled) to the second reel device 116. A majority (e.g., substantially all) of the substantially non-conductive structure 112 may initially be wrapped (e.g., spooled, coiled) around the first reel device 114, and may subsequently be wrapped around the second reel device 116 following the operation of the defect detection system 100. The first reel device 114 and the second reel device 116 may each individually comprise any device configured and operated to maintain the substantially non-conductive structure 112 in a substantially taut state during use and operation of the defect detection system 100. The first reel device 114 and the second reel device 116 may be configured and operated to wind (e.g., coil) or unwind (e.g., uncoil) portions of the substantially non-conductive structure 112. Suitable configurations for the first reel device 114 and the second reel device 116 are well known in the art, and therefore are not described in detail herein.

The movement control device 118 of the movement assembly 104 may comprise any device configured and positioned to at least partially control the movement of one or more of the first reel device 114 and the second reel device 116 (and, hence, the movement of the substantially non-conductive structure 112 operatively associated with the first reel device 114 and the second reel device 116). The movement control device 118 may be coupled to one or more of the first reel device 114 and the second reel device 116, and may be configured and operated to rotate the first reel device 114 and the second reel device 116. The movement control device 118 may modify (e.g., automatically modify, through use of computer numerical control) positions of portions of the substantially non-conductive structure 112 relative to other components (e.g., the support assembly 106, the sensor assembly 108, the marking assembly 110) of the defect detection system 100 during use and operation of the defect detection system 100. As a non-limiting example, the movement control device 118 may comprise a winch device (e.g., a motorized winch device).

As shown in FIG. 1, the movement assembly 104 may, optionally, further include one or more rotatable devices 120 (e.g., pulley devices, roller devices, wheel devices) intervening between the first reel device 114 and the second reel device 116. If present, the rotatable devices 120 may assist with desired movement of the substantially non-conductive structure 112 between the first reel device 114 and the second reel device 116, may assist in desired positioning of portions of the substantially non-conductive structure 112 relative to other components (e.g., the support assembly 106, the sensor assembly 108, the marking assembly 110) of the defect detection system 100, may assist in keeping the substantially non-conductive structure 112 taut during movement thereof, and/or may assist in mitigating (e.g., preventing) undesirable deformations of the substantially non-conductive structure 112 during movement thereof. The rotatable devices 120 may physically contact the substantially non-conductive structure 112 during use and operation of the defect detection system 100. In additional embodiments, the rotatable devices 120 may be omitted (e.g., absent) from the movement assembly 104. For example, the movement assembly 104 may include one or more stationary structures intervening between the first reel device 114 and the second reel device 116, and exhibiting one or more at least partially arcuate (e.g., curved, rounded, etc.) surfaces and/or one or more at least partially beveled surfaces facilitating desired movement, positioning, and/or tension of the substantially non-conductive structure 112 between the first reel device 114 and the second reel device 116 during use and operation of the defect detection system 100. As another example, the movement assembly 104 may be substantially free of devices (e.g., rotatable devices) and structures (e.g., stationary structures) intervening between the first reel device 114 and the second reel device 116. In further embodiments, the movement assembly 104 may employ a combination of rotatable devices (e.g., the rotatable devices 120) and stationary structures to control the movement, positioning, and/or tension of the substantially non-conductive structure 112 between the first reel device 114 and the second reel device 116 during use and operation of the defect detection system 100.

With continued reference to FIG. 1, the support assembly 106 of the defect detection system 100 may be configured and operated to support (e.g., carry) and position one or more other components (e.g., one or more components of one or more of the main computer/electronics assembly 102, the movement assembly 104, the sensor assembly 108, and the marking assembly 110) of the defect detection system 100 during use and operation of the defect detection system 100. By way of non-limiting example, as shown in FIG. 1, the support assembly 106 may include at least one laterally-extending structure 122 and one or more longitudinally-extending structures 124 (e.g., longitudinally-extending leg structures) attached (e.g., coupled, bolted, bonded, welded, etc.) to and at least partially carrying the laterally-extending structure 122.

The support assembly 106, including the individual components thereof (e.g., the laterally-extending structure 122, the longitudinally-extending structures 124), may exhibit any configuration (e.g., shape, size, material composition, component arrangement, etc.) sufficient to provide stability to the other components of the defect detection system 100 at least partially carried thereby, and that does not impede or prevent desired operation of the other components of the defect detection system 100. One or more components of the support assembly 106 may, for example, be formed of and include one or more rigid materials that do not substantially interfere with (e.g., block, reflect) signals generated and employed by the sensor assembly 108 to detect defects in the substantially non-conductive structure 112. By way of non-limiting example, at least a portion (e.g., an upper portion) of the laterally-extending structure 122 proximate the sensor assembly 108 may be formed of and include a non-conductive material that does not substantially reflect electromagnetic energy generated and employed by the sensor assembly 108. The non-conductive material may, for example, comprise non-conductive polymeric material (e.g. a non-conductive foam, a non-conductive plastic) that does not substantially reflect radio frequency (RF) energy generated and employed by the sensor assembly 108. The non-conductive material may be transparent to and/or may absorb the electromagnetic energy generated by the sensor assembly 108. Optionally, another portion (e.g., a lower portion) of the laterally-extending structure 122 may be formed of and include an additional non-conductive material, such as a non-conductive material (e.g., a non-conductive foam, a non-conductive plastic) formulated to block (e.g., absorb, reflect) background electromagnetic energy (e.g., electromagnetic energy, such as RF energy, not generated by the sensor assembly 108). The additional non-conductive material may, for example, mitigate undesirable detection of the background electromagnetic energy by the sensor assembly 108.

The support assembly 106 may be stationary, or may be at least partially mobile. For example, as shown in FIG. 1, the support assembly 106 may, optionally, further include wheel assemblies 126 connected (e.g., attached, coupled, etc.) to one or more other portions thereof (e.g., to the longitudinally-extending structures 124) to facilitate movement of the support assembly 106 (and the other components of the defect detection system 100 carried thereby) in one or more directions. One or more of the wheel assemblies 126 may, optionally, include a locking mechanism configured to at least partially secure the support assembly 106 in a desired position during use and operation of the defect detection system 100. In further embodiments, the support assembly 106 may employ a different means of movement. For example, the support assembly 106 may be connected to a track assembly facilitating movement of the support assembly 106 in one or more directions.

The sensor assembly 108 is positioned between the first reel device 114 and the second reel device 116 of the movement assembly 104, and is configured to sense defects (e.g., conductive debris) in the substantially non-conductive structure 112 during use and operation of the defect detection system 100. As shown in FIG. 1, the sensor assembly 108 may be in electronic communication (e.g., wireless communication) with the main computer/electronics assembly 102. As described in further detail below, the sensor assembly 108 may be configured and operated to receive inputs (e.g., wireless communications) from the main computer/electronics assembly 102, and may also be configured and operated to output data to the main computer/electronics assembly 102 that the main computer/electronics assembly 102 may employ to identify and act upon (e.g., by way of the marking assembly 110) defects (e.g., conductive debris) within the substantially non-conductive structure 112.

As shown in FIG. 1, the sensor assembly 108 includes at least one radar device 128 configured and operated to transmit and receive electromagnetic energy (e.g., RF energy). The at least one radar device 128 may comprise a monostatic radar device, a quasi-monostatic radar device, a bistatic radar device, or a combination thereof. In some embodiments, the radar device 128 comprises a monostatic radar device including at least one transmitter, at least one receiver, at least one antenna shared by the transmitter and the receiver, and at least one device (e.g., a circulator) to distinguish between electromagnetic energy transmitted by the radar device 128 and electromagnetic energy received by the radar device 128. In additional embodiments, the radar device 128 comprises a quasi-monostatic radar device including at least one transmitter, at least one transmitting antenna operatively associated with the transmitter, at least one receiver, and at least one receiving antenna operatively associated with the receiver. In further embodiments, the radar device 128 comprises a bistatic radar device including at least one transmission device and at least one receiving device separate and discrete from (e.g., within a different, spatially separated containment vessel) the transmission device. The transmission device may include at least one transmitter and at least one transmitting antenna operatively associated with the transmitter, and the receiving device may include at least one receiver and at least one receiving antenna operatively associated with the receiver.

The radar device 128 is configured and positioned to transmit electromagnetic energy into the substantially non-conductive structure 112, and to receive reflected electromagnetic energy from the substantially non-conductive structure 112. The reflected electromagnetic energy may result from interactions between the transmitted electromagnetic energy and undesirable debris (e.g., conductive debris, such as conductive particles, conductive fibers, etc.) (if any) within the substantially non-conductive structure 112. Electromagnetic energy transmitted from the radar device 128 may substantially pass through regions of the substantially non-conductive structure 112 free of undesirable (e.g., conductive) debris, whereas regions of the substantially non-conductive structure 112 including undesirable debris may at least partially reflect the electromagnetic energy back to the radar device 128 to facilitate a determination as to the position and geometric configuration (e.g., size, shape) of the undesirable debris.

The radar device 128 may be configured and operated to detect debris within the substantially non-conductive structure 112 capable of reflecting electromagnetic energy transmitted from radar device 128 back to the radar device 128. For example, the radar device 128 may detect conductive debris within the substantially non-conductive structure 112 exhibiting a size greater than or equal to about one (1) micrometer (μm). The conductive debris may be metallic or may be non-metallic. By way of non-limiting example, the conductive debris may comprise one or more of a metal, a metal alloy, a conductive metal oxide, a conductive metal nitride, a conductive metal silicide, a conductive carbon material (e.g., graphite, graphene, carbon black, carbon nanotubes, etc.), a conductively coated material (e.g., nickel coated carbon fibers, nickel-copper coated carbon fibers, etc.) and a conductively doped material.

The radar device 128 may be disposed laterally (e.g., horizontally) adjacent the substantially non-conductive structure 112. At least a portion of the radar device 128 may be provided at the same longitudinal (e.g., vertical) position (e.g., the same position in the Z-direction) as the portion of the substantially non-conductive structure 112 receiving the electromagnetic energy from the radar device 128. Put another way, at least a portion of the radar device 128 may reside on the same lateral plane(s) as the portion of substantially non-conductive structure 112 receiving the electromagnetic energy from the radar device 128. Accordingly, as described in further detail below, the radar device 128 may be configured and positioned to direct electromagnetic energy (e.g., RF energy) into the sides (e.g., as opposed to the top and/or the bottom) of the substantially non-conductive structure 112 to facilitate the detection of defects (e.g., conductive debris) within the substantially non-conductive structure 112. As shown in FIG. 1, in some embodiments, a central lateral axis of the radar device 128 is substantially longitudinally aligned with a central lateral axis of the portion of the substantially non-conductive structure 112 receiving the electromagnetic energy from the radar device 128. In additional embodiments, the central lateral axis of the radar device 128 is longitudinally offset from (e.g., longitudinally above, longitudinally below) the central lateral axis of the portion of the substantially non-conductive structure 112 receiving the electromagnetic energy from the radar device 128, so long as the radar device 128 is still able to direct electromagnetic energy into the sides of the portion of the substantially non-conductive structure 112 to facilitate the detection of defects within the portion of the substantially non-conductive structure 112.

The sensor assembly 108 may include any suitable quantity and any desired distribution of radar devices 128. The sensor assembly 108 may include a single (e.g., only one (1)) radar device 128 positioned laterally adjacent (e.g., partially outwardly laterally surrounding) the substantially non-conductive structure 112, or may include multiple (e.g., more than one (1), such as at least two (2), at least three (3), at least four (4), or at least five (5)) radar devices 128 positioned laterally adjacent the substantially non-conductive structure 112. If the sensor assembly 108 includes multiple radar devices 128, at least some of the radar devices 128 may be provided at the substantially the same lateral position (e.g., substantially the same position in the X-direction) as one another, and/or at least some of the radar devices 128 may be provided at different lateral positions (e.g., different positions in the X-direction) than one another. For example, the sensor assembly 108 may include at least two (2) radar devices 128 located at substantially the same position as one another in the X-direction, but opposing one another from opposite sides of the substantially non-conductive structure 112. As another example, the sensor assembly 108 may include at least two (2) radar devices 128 located at different positions than one another in the X-direction, wherein the radar devices 128 are each positioned laterally adjacent the same side of the substantially non-conductive structure 112, or wherein at least one of the radar devices 128 is positioned laterally adjacent a different side of the substantially non-conductive structure 112 than at least one other of the radar devices 128.

In some embodiments, the sensor assembly 108 only includes one (1) radar device 128. For example, referring to FIG. 2, which shows a simplified top down view of the sensor assembly 108 in accordance with an embodiment of the disclosure, the sensor assembly 108 may include a single radar device 128 positioned laterally adjacent the substantially non-conductive structure 112. The radar device 128 may be positioned adjacent a first side 113a of the substantially non-conductive structure 112, and a second, opposing side 113b of the substantially non-conductive structure 112 may be free of a radar device 128 positioned adjacent thereto.

Figure 2:
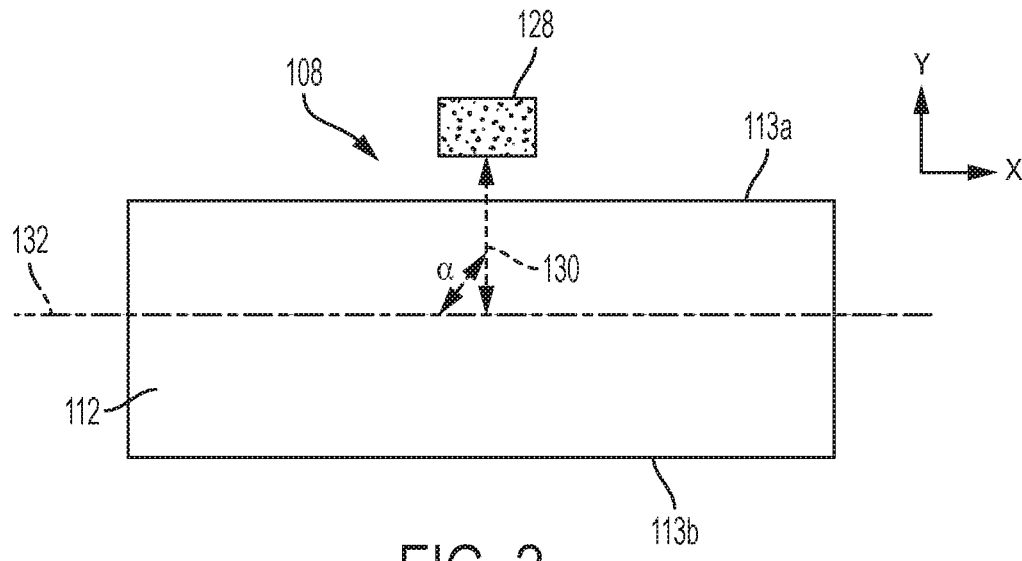
FIG. 2 is a simplified top-down view of a sensor assembly of the defect detection system depicted in FIG. 1, in accordance with embodiments of the disclosure.

With continued reference to FIG. 2, the radar device 128 may be oriented so as to direct and receive wave fronts 130 (e.g., incident wave fronts, scattered wave fronts) of electromagnetic energy (e.g., RF energy) toward (e.g., into) and from the substantially non-conductive structure 112 at an angle α within a range of from about 0 degrees to about 90 degrees (e.g., from about 5 degrees to about 90 degrees, from about 15 degrees to about 90 degrees, from about 30 degrees to about 90 degrees, from about 45 degrees to about 90 degrees, or from about 60 degrees to about 90 degrees) relative to one or more (e.g., each) of the first side 113a of the substantially non-conductive structure 112 and a central longitudinal axis 132 of the substantially non-conductive structure 112 in the Y-direction. In some embodiments, the radar device 128 is configured and positioned to direct and receive wave fronts 130 of electromagnetic energy toward (e.g., into) and from the substantially non-conductive structure 112 at an angle α of about 90 degrees relative to the first side 113a of the substantially non-conductive structure 112.

Figure 3:
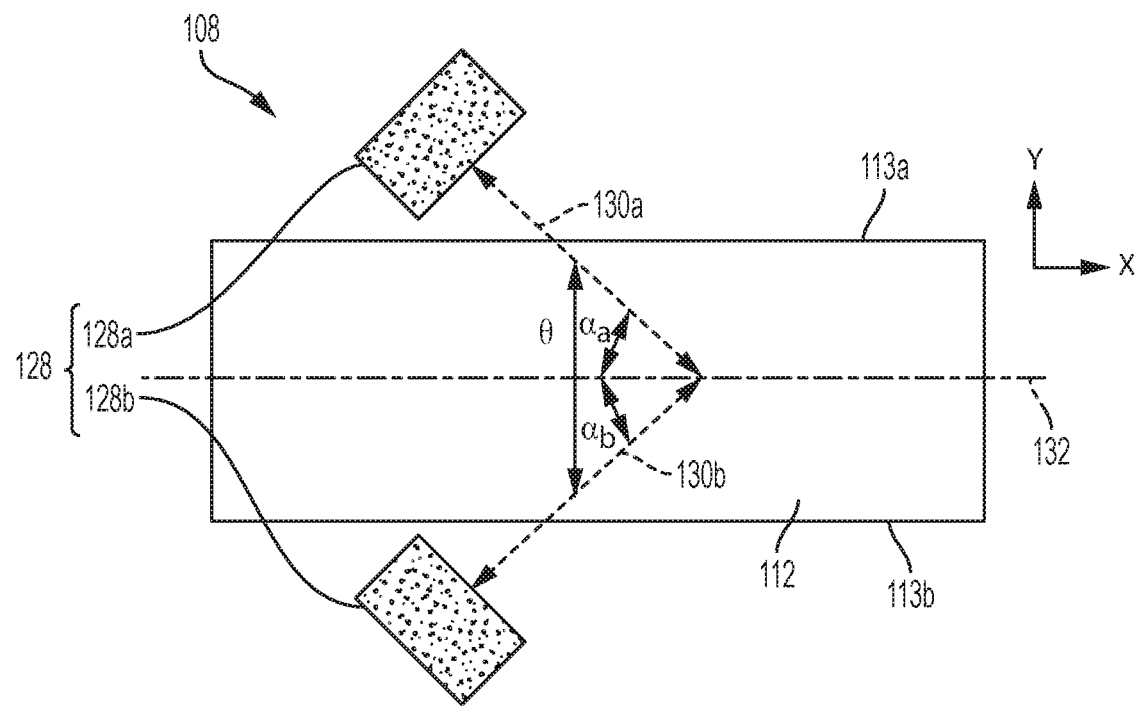
FIG. 3 is a simplified top-down view of a sensor assembly of the defect detection system depicted in FIG. 1, in accordance with additional embodiments of the disclosure.

In additional embodiments, the sensor assembly 108 includes at least two (2) radar devices 128. For example, referring to FIG. 3, which shows a simplified top down view of the sensor assembly 108 in accordance with another embodiment of the disclosure, the sensor assembly 108 may include a first radar device 128a and a second radar device 128b. The first radar device 128a and the second radar device 128b may be substantially the same as one another (e.g., the first radar device 128a and the second radar device 128b may each include substantially the same components and component arrangements as one another), or the first radar device 128a may be different than the second radar device 128b (e.g., the first radar device 128a may include different components and/or different component arrangements than the second radar device 128b). The first radar device 128a may be positioned laterally adjacent the first side 113a of the substantially non-conductive structure 112, and the second radar device 128b may be positioned adjacent the second, opposing side 113b of the substantially non-conductive structure 112. As shown in FIG. 3, the first radar device 128a may be provided at substantially the same position in the X-direction as the second radar device 128b, such that the first radar device 128a and the second radar device 128b are aligned with one another in the Y-direction. In additional embodiments, the first radar device 128a is provided at a different position in the X-direction than the second radar device 128b, such that the first radar device 128a and the second radar device 128b are offset from one another in the Y-direction. In further embodiments, the first radar device 128a and the second radar device 128b are both positioned laterally adjacent the same side (e.g., the first side 113a or the second side 113b) of the substantially non-conductive structure 112.

With continued reference to FIG. 3, the first radar device 128a may be oriented so as to direct and receive first wave fronts 130a (e.g., first incident wave fronts, first scattered wave fronts) of electromagnetic energy (e.g., RF energy) toward (e.g., into) and from the substantially non-conductive structure 112 at a first angle $\alpha_a$ within a range of from about 0 degrees to about 90 degrees (e.g., from about 5 degrees to about 90 degrees, from about 15 degrees to about 90 degrees, from about 30 degrees to about 90 degrees, from about 45 degrees to about 90 degrees, or from about 60 degrees to about 90 degrees) relative to one or more (e.g., each) of the first side 113a of the substantially non-conductive structure 112 and the central longitudinal axis 132 of the substantially non-conductive structure 112 in the Y-direction. In addition, the second radar device 128b may be oriented so as to direct and receive second wave fronts 130b (e.g., second incident wave fronts, second scattered wave fronts) of electromagnetic energy (e.g., RF energy) toward (e.g., into) and from the substantially non-conductive structure 112 at a second angle $\alpha_b$ within a range of from about 0 degrees to about 90 degrees (e.g., from about 5 degrees to about 90 degrees, from about 15 degrees to about 90 degrees, from about 30 degrees to about 90 degrees, from about 45 degrees to about 90 degrees, or from about 60 degrees to about 90 degrees) relative to one or more (e.g., each) of the second side 113b of the substantially non-conductive structure 112 and the central longitudinal axis 132 of the substantially non-conductive structure 112 in the Y-direction. The first angle $\alpha_a$ may be substantially the same as or may be different than the second angle $\alpha_b$. In some embodiments, the first angle $\alpha_a$ and the second angle $\alpha_b$ are substantially the same as one another. In addition, an angle θ between the direction of the first wave fronts 130a and the direction of the second wave fronts 130b may be less than 180 degrees, such as within a range of from about 10 degrees to about 170 degrees, within a range of from about 30 degrees to about 150 degrees, within a range of from about 60 degrees to about 140 degrees, or within a range of from about 90 degrees to about 120 degrees.

The first radar device 128a and the second radar device 128b may be configured and positioned to simultaneously direct electromagnetic energy toward substantially the same portion of the substantially non-conductive structure 112, may be configured and positioned to simultaneously direct electromagnetic energy toward different portions of the substantially non-conductive structure 112 than one another, may be configured and positioned to sequentially direct electromagnetic energy toward substantially the same portion of the substantially non-conductive structure 112, or may be configured and positioned to sequentially direct electromagnetic energy toward different portions of the substantially non-conductive structure 112 than one another. Employing multiple radar devices 128 (e.g., the first radar device 128a, and the second radar device 128b) provided at different locations and orientations than one another may enhance detection of defects (e.g., conductive debris) within the substantially non-conductive structure 112 by enhancing the probably of interactions between the electromagnetic energy transmitted by the multiple radar devices 128 and the defects within the substantially non-conductive structure 112. For example, employing multiple radar devices 128 may permit at least one of the multiple radar devices 128 (e.g., the first radar device 128a) to detect debris that at least one other of the multiple radar devices 128 (e.g., the second radar device 128b) may be unable to detect (e.g., due to non-uniform angular scattering from defects), and/or employing multiple radar devices 128 may enhance positive detection confidence when the same defect (e.g., debris) is detected by more than one of the multiple radar devices 128.

Figure 4:
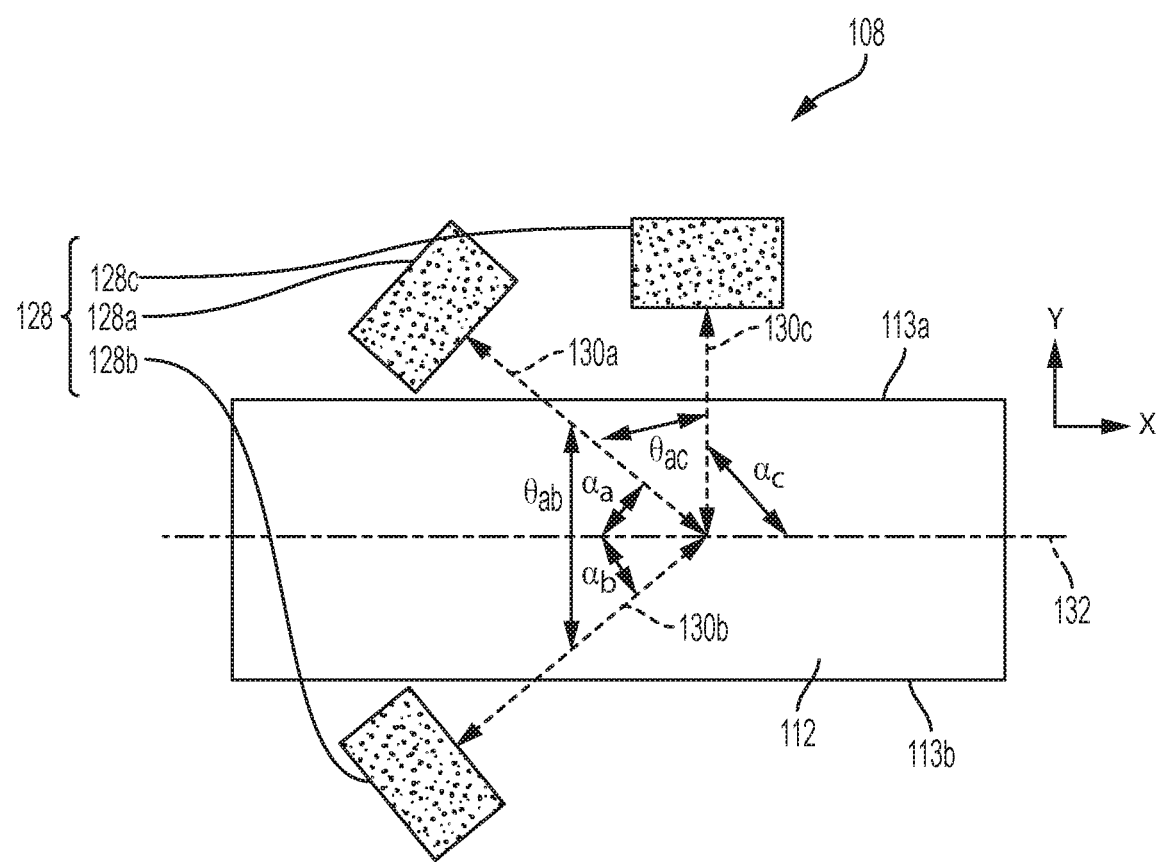
FIG. 4 is a simplified top-down view of a sensor assembly of the defect detection system depicted in FIG. 1, in accordance with further embodiments of the disclosure.

In further embodiments, the sensor assembly 108 includes at least three (3) radar devices 128. For example, referring to FIG. 4, which shows a simplified top down view of the sensor assembly 108 in accordance with yet another embodiment of the disclosure, the sensor assembly 108 may include a first radar device 128a, the second radar device 128b, and a third radar device 128c. The first radar device 128a, the second radar device 128b, and the third radar device 128c may be substantially the same as one another (e.g., the first radar device 128a, the second radar device 128b, and the third radar device 128c may each include substantially the same components and component arrangements as one another), or one or more of the first radar device 128a, the second radar device 128b, and the third radar device 128c may be different than (e.g., may include different components and/or different component arrangements) one or more other of the first radar device 128a, the second radar device 128b, and the third radar device 128c. The first radar device 128a and the third radar device 128c may be positioned laterally adjacent the first side 113a of the substantially non-conductive structure 112, and the second radar device 128b may be positioned adjacent the second, opposing side 113b of the substantially non-conductive structure 112. As shown in FIG. 4, the first radar device 128a may be provided at substantially the same position in the X-direction as the second radar device 128b, and may be provided at a different position in the X-direction than the third radar device 128c. In additional embodiments, one or more of the first radar device 128a, the second radar device 128b, and the third radar device 128c may be provided at one or more different positions than those depicted in FIG. 4. For example, one or more of the first radar device 128a, the second radar device 128b, and the third radar device 128c may be provided at one or more different positions in the Y-direction (e.g., the first radar device 128a, the second radar device 128b, and the third radar device 128c may all be positioned laterally adjacent the same side of the substantially non-conductive structure 112); and/or one or more of the first radar device 128a, the second radar device 128b, and the third radar device 128c may be provided at one or more different positions in the X-direction.

With continued reference to FIG. 4, the first radar device 128a may be oriented so as to direct and receive the first wave fronts 130a of electromagnetic energy toward (e.g., into) and from the substantially non-conductive structure 112 at the first angle $\alpha_a$, the second radar device 128b may be oriented so as to direct and receive second wave fronts 130b of electromagnetic energy toward (e.g., into) and from the substantially non-conductive structure 112 at the second angle $\alpha_b$, and the third radar device 128c may be oriented so as to direct and receive third wave fronts 130c of electromagnetic energy toward (e.g., into) and from the substantially non-conductive structure 112 at a third angle $\alpha_c$. The first angle $\alpha_a$, the second angle $\alpha_b$, and the third angle $\alpha_c$ may each individually be within a range of from about 0 degrees to about 90 degrees (e.g., from about 5 degrees to about 90 degrees, from about 15 degrees to about 90 degrees, from about 30 degrees to about 90 degrees, from about 45 degrees to about 90 degrees, or from about 60 degrees to about 90 degrees) relative to one or more (e.g., each) of first side 113a of the substantially non-conductive structure 112, the second side 113b of the substantially non-conductive structure 112, and the central longitudinal axis 132 of the substantially non-conductive structure 112 in the Y-direction. The first angle $\alpha_a$, the second angle $\alpha_b$, and the third angle $\alpha_c$ may be substantially the same as one another, or at least one of the first angle $\alpha_a$, the second angle $\alpha_b$, and the third angle $\alpha_c$ may be different than at least one other of the first angle $\alpha_a$, the second angle $\alpha_b$, and the third angle $\alpha_c$. In some embodiments, the first angle $\alpha_a$ is substantially the same as the second angle $\alpha_b$, and is different than the third angle $\alpha_c$. In addition, a first angle $\theta_{ab}$ between the direction of the first wave fronts 130a and the direction of the second wave fronts 130b and a second angle $\theta_{ac}$ between the direction of the first wave fronts 130a and the direction of the third wave fronts 130c may each individually be less than 180 degrees (e.g., within a range of from about 10 degrees to about 170 degrees, such as from about 30 degrees to about 150 degrees, from about 60 degrees to about 140 degrees, or from about 90 degrees to about 120 degrees. The first angle $\theta_{ab}$ between the direction of the first wave fronts 130a and the direction of the second wave fronts 130b may be substantially the same as or may be different than the second angle $\theta_{ac}$ between the direction of the first wave fronts 130a and the direction of the third wave fronts 130c. In some embodiments, the first angle $\theta_{ab}$ is 90 degrees and the second angle $\theta_{ac}$ is about 45 degrees. In additional embodiments, the first angle $\theta_{ab}$ and the second angle $\theta_{ac}$ are each about 60 degrees.

The first radar device 128a, the second radar device 128b, and the third radar device 128c may be configured and positioned to simultaneously direct electromagnetic energy toward substantially the same portion of the substantially non-conductive structure 112, may be configured and positioned to simultaneously direct electromagnetic energy toward different portions of the substantially non-conductive structure 112 than one another, may be configured and positioned to sequentially direct electromagnetic energy toward substantially the same portion of the substantially non-conductive structure 112, and/or may be configured and positioned to sequentially direct electromagnetic energy toward different portions of the substantially non-conductive structure 112 than one another.

With returned reference to FIG. 1, the sensor assembly 108, including the radar device(s) 128 thereof, may be configured to generate electromagnetic energy having a sufficient bandwidth to detect defects (e.g., conductive debris) having a size (e.g., width, length, etc.) at least as small as about 500 μm, such at least as small as about 250 μm, at least as small as about 100 μm, or at least as small as about 1 μm. By way of non-limiting example, the sensor assembly 108 may be configured and operated to generate electromagnetic energy having a bandwidth within a range of from about 5 gigahertz (GHz) to about 15 GHz (e.g., about 10 GHz). A center frequency of the electromagnetic energy generated by the radar device(s) 128 of the sensor assembly 108 may, for example, be within a range of from about 9 GHz to about 10 GHz.

With continued reference to FIG. 1, the marking assembly 110 is configured and operated to mark the defects (e.g., conductive debris) sensed by the sensor assembly 108 for subsequent action on (e.g., removal of) the defects. As shown in FIG. 1, the marking assembly 110 may be in electronic communication (e.g., wireless communication) with the main computer/electronics assembly 102. The marking assembly 110 may be configured and operated to receive inputs (e.g., wireless communications) from the main computer/electronics assembly 102, and may also be configured and operated to output data to the main computer/electronics assembly 102.

The marking assembly 110 may physically mark and/or may digitally mark the substantially non-conductive structure 112 at the location(s) of defects (e.g., conductive debris) sensed by the sensor assembly 108. In some embodiments, the marking assembly 110 is configured and operated to apply a physical mark on the substantially non-conductive structure 112 location(s) of defects (e.g., conductive debris) detected by the sensor assembly 108. By way of non-limiting example, the marking assembly 110 may apply one or more of an etch mark, a laser-based mark, a stain-based mark (e.g., a pigment-based mark, such as a visible-spectrum-based pigment mark, an infrared-spectrum-based pigment mark, an ultraviolet-spectrum-based mark; a reflective material mark; a fluorescent material mark; a phosphorescent material mark), a heat-based mark, and an adhesive-based mark to the substantially non-conductive structure 112. The physical mark applied by the marking assembly 110 may, for example, be used by an operator and/or an apparatus (e.g., a cutting apparatus) to selectively remove (e.g., cut out) defects from the substantially non-conductive structure 112 (e.g., before and/or after the substantially non-conductive structure 112 is completely transferred from the first reel device 114 to the second reel device 116). In additional embodiments, the marking assembly 110 is configured and operated to digitally mark the location(s) of defects (e.g., conductive debris) within the substantially non-conductive structure 112. The marking assembly 110 may, for example, interact with (e.g., by one or more software operations) with the main computer/electronics assembly 102 to digitally store (e.g., by way of one or more memory devices) the location(s) of the defects within the substantially non-conductive structure 112. The digital mark(s) may, for example, be used by an apparatus (e.g., a cutting apparatus, such as an automatic cutting apparatus) to selectively remove (e.g., cut out) defects from the substantially non-conductive structure 112 (e.g., before and/or after the substantially non-conductive structure 112 is completely transferred from the first reel device 114 to the second reel device 116). If employed, the digital mark(s) may alleviate the need to physically alter the substantially non-conductive structure 112 prior to subsequent operations (e.g., defect removal operations).

The defect detection system 100 may, optionally, include other structures and/or devices, such as material removal devices, additional sensors (e.g., temperature sensors, audio sensors, radiation sensors, moisture sensors, etc.), and/or a supplemental computer/electronics assembly. For example, as shown in FIG. 1, the defect detection system 100 may, optionally, include at least one material removal device 134 positioned downstream of the sensor assembly 108 (e.g., between the marking assembly 110 and the second reel device 116 of the movement assembly 104). In some embodiments, the material removal device 134 comprises a cutting device (e.g., a laser cutting device, a punching device, a scissor device, etc.) in electronic communication with the main computer/electronics assembly 102 and configured and operated to selectively remove one or more areas of the substantially non-conductive structure 112 identified by the sensor assembly 108 and marked (e.g., physically marked and/or digitally marked) by the marking assembly 110 as exhibiting one or more defects (e.g., conductive-debris-based defects). In additional embodiments, the material removal device 134 comprises a debris removal device (e.g., a tweezers device) in electronic communication with the main computer/electronics assembly 102 and configured and operated to selectively remove debris (e.g., conductive debris) from one or more areas of the substantially non-conductive structure 112 identified by the sensor assembly 108 as exhibiting one or more defects without substantially removing the one or more areas of the substantially non-conductive structure 112. In further embodiments, the material removal device 134 is omitted from the defect detection system 100.

During use and operation of the defect detection system 100, the substantially non-conductive structure 112 may be transferred (e.g., pulled) from the first reel device 114 of the movement assembly 104 to the second reel device 116 of the movement assembly 104. As the substantially non-conductive structure 112 is transferred to the second reel device 116, the sensor assembly 108 detects defect(s) (e.g., conductive-debris-based defect(s)) (if any) in portions of the substantially non-conductive structure 112 using the radar device(s) 128 thereof. Data from the sensor assembly 108 is communicated to the main computer/electronics assembly 102, which may analyze the data and communicate with the marking assembly 110 to identify (e.g., physically mark, digitally mark) the location(s) of the defect(s) (if any) for subsequent action (e.g., subsequent removal using the material removal device 134).

Figure 5:
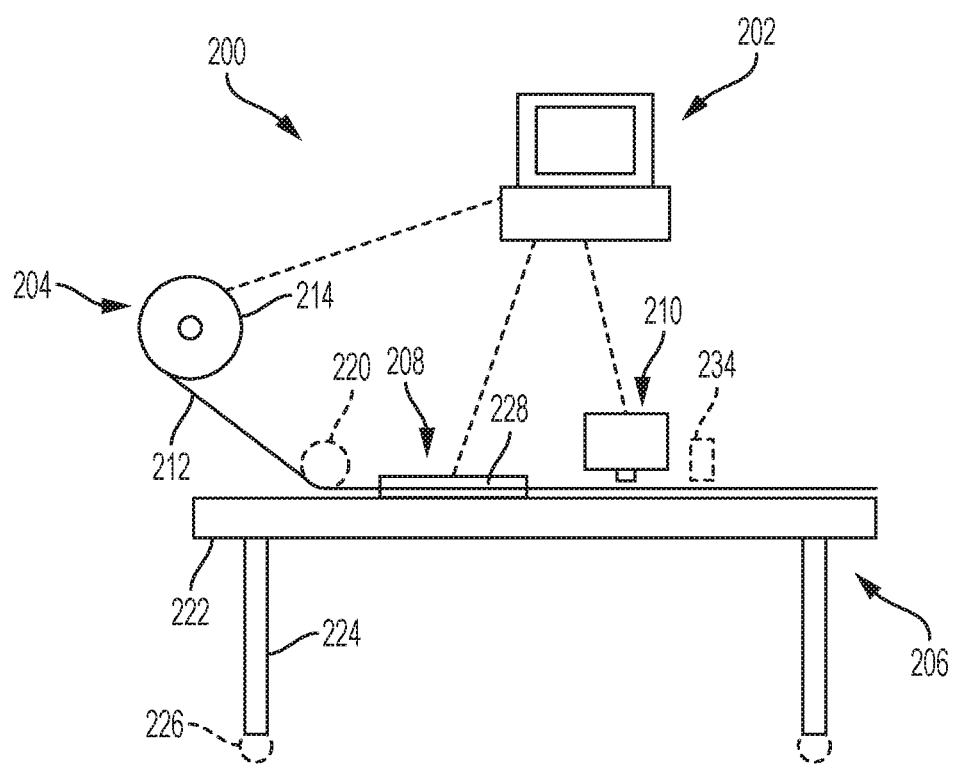
FIG. 5 is a simplified schematic side elevation view of another defect detection system, in accordance with additional embodiments of the disclosure.

As previously described above, the defect detection system 100 may be formed to exhibit a different configuration than that depicted in FIG. 1. By way of non-limiting example, FIG. 5 is a simplified longitudinal schematic view of a defect detection system 200 in accordance with embodiments of the disclosure. The defect detection system 200 may have some similar features and functionalities to the defect detection system 100 (FIG. 1). For example, the defect detection system 200 may include a main computer/electronics assembly 202, a movement assembly 204 (e.g., including at least one first reel device 214; and, optionally, one or more rotatable devices 220), a support assembly 206 (e.g., including at least one laterally-extending structure 222; at least one longitudinally-extending structure 224; and, optionally, one or more wheel assemblies 226), a sensor assembly 208 (e.g., including one or more radar devices 228), and a marking assembly 210. To avoid repetition, not all features shown in FIG. 5 are described in detail herein. Rather, unless described otherwise below, features designated by a reference numeral that is a 100 increment of the reference numeral of a feature described previously in relation to one or more of FIGS. 1 through 4 will be understood to be substantially similar to the feature described previously.

As shown in FIG. 5, in contrast to the configuration of the defect detection system 100 (FIG. 1), the movement assembly 204 of the defect detection system 200 may be free of at least one second reel device configured and operated to receive a non-conductive structure 212 from the first reel device 214. For example, the non-conductive structure 212 may be transferred from the first reel device 214 to one or more apparatuses downstream of the defect detection system 100, such as one or more devices (e.g., placement devices, shaping devices, curing devices), assemblies, and/or systems configured and operated to prepare the non-conductive structure 212 for a desired use thereof. The second reel device (e.g., the second reel device 116 previously described with reference to FIG. 1) may, for example, be omitted (e.g., absent) when at least temporary storage of the non-conductive structure 212 following the detection of defects (e.g., conductive debris) therein is not desired.

The systems, apparatuses, and methods according to embodiments of the disclosure advantageously facilitate the continuous and real time detection of defects in one or more non-conductive structure(s) (e.g., the non-conductive structures 112, 212). The defect detection systems (e.g., the defect detection systems 100, 200) of the disclosure, including the various components thereof, provides a fast and flexible means of continuously evaluating the one or more non-conductive structure(s), identifying any undesirable debris (e.g., conductive debris) therein and/or thereon, and, optionally, selectively removing the undesirable debris therefrom. The apparatuses, systems, and methods of the disclosure may readily identify and resolve disparities (e.g., inconsistencies) within a desired material composition of the non-conductive structure(s), reducing costs (e.g., process downtime costs, etc.) and risks (e.g., product contamination risks) as compared to conventional apparatuses, conventional systems, and conventional methods for identifying and resolving disparities within a desired material composition of the non-conductive structure(s). The apparatuses, systems, and methods of the disclosure advantageously facilitate the analysis of different portions of the non-conductive structure(s), permitting the removal of defects (if any) detected in one or more portions of the non-conductive structure(s) without affecting the configuration (e.g., shape, size, material composition) of one or more other portions of the non-conductive structure(s). The apparatuses, systems, and methods of the disclosure may permit the utilization of portion(s) of a non-conductive structure(s) that may otherwise need to be wasted (e.g., scrapped, discarded) due to contamination (e.g., conductive-debris-based contamination) risks.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A defect detection system, comprising:
   a movement assembly configured and positioned to hold and move a substantially non-conductive structure, the movement assembly comprising:
     a first reel device upstream of the sensor assembly and configured to hold a spool of the substantially non-conductive structure; and
     a second reel device downstream of the sensor assembly and configured to attach to an end of the substantially non-conductive structure; and
   a sensor assembly comprising at least one radar device configured and positioned to detect conductive debris in the substantially non-conductive structure as portions of the substantially non-conductive structure move therepast.

2. The defect detection system of claim 1, wherein at least a portion of the at least one radar device is located on the same lateral plane as a portion of the substantially non-conductive structure to receive electromagnetic energy from the at least one radar device.

3. The defect detection system of claim 1, wherein the at least one radar device of the sensor assembly comprises one or more of at least one monostatic radar device and at least one quasi-monostatic radar device.

4. The defect detection system of claim 1, wherein the at least one radar device comprises a plurality of radar devices.

5. The defect detection system of claim 4, wherein the plurality of radar devices comprises:
   a first radar device laterally adjacent a first side of the substantially non-conductive structure; and
   a second radar device laterally adjacent a second side of the of the substantially non-conductive structure opposing the first side.

6. The defect detection system of claim 5, further comprising a third radar device laterally adjacent the first side of the substantially non-conductive structure.

7. The defect detection system of claim 6, wherein one or more of the first radar device, the second radar device, and the third radar device is oriented to direct electromagnetic energy into the substantially non-conductive structure at a different angle than at least one other of the first radar device, the second radar device, and the third radar device.

8. The defect detection system of claim 1, further comprising a marking assembly configured and positioned to mark a location of the conductive debris detected by the sensor assembly along the substantially non-conductive structure.

9. The defect detection system of claim 8, further comprising a material removal device configured and positioned to remove the conductive debris from the location marked by the marking assembly.

10. The defect detection system of claim 1, further comprising a support assembly comprising a laterally-extending structure longitudinally underlying the substantially non-conductive structure and comprising a material formulated to block background electromagnetic energy.

11. A defect detection method, comprising:
    delivering a substantially non-conductive structure to a defect detection system comprising a movement assembly and a sensor assembly, the substantially non-conductive structure comprising a non-conductive fiber preform infiltrated with a non-conductive slurry;
    moving the substantially non-conductive structure through the defect detection system using the movement assembly; and
    directing electromagnetic energy into the substantially non-conductive structure from at least one radar device of the sensor assembly to detect conductive debris within the substantially non-conductive structure.

12. The method of claim 11, further comprising marking a location of the detected conductive debris within the substantially non-conductive structure using a marking assembly of the defect detection system.

13. The method of claim 12, further comprising removing the detected conductive debris from the substantially non-conductive structure using a material removal device of the defect detection system.

14. The method of claim 11, wherein directing electromagnetic energy into the substantially non-conductive structure from at least one radar device of the sensor assembly comprises directing the electromagnetic energy into one or more portions of the substantially non-conductive structure from two or more radar devices laterally adjacent the one or more portions of the substantially non-conductive structure.

15. The method of claim 14, further comprising orienting at least one of the two or more radar devices at a different angle relative to the substantially non-conductive structure than at least one other of the two or more radar devices.

16. The method of claim 11, wherein directing electromagnetic energy into the substantially non-conductive structure from at least one radar device of the sensor assembly comprises selecting the electromagnetic energy to have a center frequency within a range of from about 9 GHz to about 10 GHz.

17. The method of claim 11, wherein directing electromagnetic energy into the substantially non-conductive structure from at least one radar device of the sensor assembly to detect conductive debris within the substantially non-conductive structure comprises:
    directing radio frequency energy into the substantially non-conductive structure from the at least one radar device; and
    receiving at least some of the radio frequency energy reflected off of the conductive debris with the at least one radar device to detect the conductive debris.

18. A defect detection method, comprising:
    extending a substantially non-conductive structure between a first reel device and a second reel device of a movement assembly of a defect detection system, the defect detection system comprising the movement assembly and a sensor assembly;
    moving the substantially non-conductive structure through the defect detection system using the movement assembly; and directing electromagnetic energy into the substantially non-conductive structure from at least one radar device of the sensor assembly to detect conductive debris within the substantially non-conductive structure.

19. A method of processing a composite structure, comprising:
pulling a prepreg structure comprising a non-conductive preform infiltrated with a non-conductive slurry from a first reel device;
directing electromagnetic energy into the prepreg structure from a plurality of monostatic radar devices positioned laterally adjacent the prepreg structure to detect conductive debris within the prepreg structure;
marking portions of the prepreg structure containing the detected conductive debris; and
removing the marked portions of the prepreg structure and the detected conductive debris while substantially maintaining a remainder of the prepreg structure.

20. The method of claim 19, wherein directing electromagnetic energy into the prepreg structure from a plurality of monostatic radar devices positioned laterally adjacent the prepreg structure to detect conductive debris within the prepreg structure comprises:
directing the electromagnetic energy into the prepreg structure from at least one monostatic radar device of the plurality of monostatic radar devices; and
detecting at least some of the electromagnetic energy reflected off of the conductive debris using the at least one monostatic radar device of the plurality of monostatic radar devices.

* * * * *

UNITED STATES PATENT AND TRADEMARK OFFICE
CERTIFICATE OF CORRECTION

PATENT NO. : 10,808,353 B2
APPLICATION NO. : 15/694424
DATED : October 20, 2020
INVENTOR(S) : Green et al.

Page 1 of 1

It is certified that error appears in the above-identified patent and that said Letters Patent is hereby corrected as shown below:

In the Specification

| | | |
|---|---|---|
| Column 3, | Lines 63-64, | change ""consisting of and" consisting essentially of" to --"consisting of" and "consisting essentially of"-- |
| Column 8, | Line 24, | change "about one-hundred" to --about one hundred-- |
| Column 13, | Line 46, | change "the second side" to --the second, opposing side-- |
| Column 15, | Line 44, | change "the second side" to --the second, opposing side-- |

Signed and Sealed this
First Day of December, 2020

Andrei Iancu
*Director of the United States Patent and Trademark Office*